US010107121B2

(12) United States Patent
Roberts

(10) Patent No.: US 10,107,121 B2
(45) Date of Patent: Oct. 23, 2018

(54) CARBON SEAL ASSEMBLY

(71) Applicant: Pratt & Whitney Canada Corp., Longueuil (CA)

(72) Inventor: Ivor John Roberts, Rockwood (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 119 days.

(21) Appl. No.: 13/705,259

(22) Filed: Dec. 5, 2012

(65) Prior Publication Data

US 2014/0154053 A1    Jun. 5, 2014

(51) Int. Cl.
*F16J 15/34* (2006.01)
*F01D 11/00* (2006.01)
*F02C 7/28* (2006.01)

(52) U.S. Cl.
CPC .......... *F01D 11/00* (2013.01); *F02C 7/28* (2013.01); *F16J 15/3444* (2013.01); *F05D 2240/55* (2013.01); *F05D 2300/224* (2013.01)

(58) Field of Classification Search
CPC ........ F16J 15/3496; F16J 15/344; F16J 15/43; F16J 15/3444; F01D 11/00; F02C 7/28; F05D 2240/55; F05D 2300/224
USPC ................ 277/302, 378, 404, 501, 629, 358
See application file for complete search history.

(56) References Cited

U.S. PATENT DOCUMENTS

| | | | |
|---|---|---|---|
| 2,589,766 A | 3/1952 | Bradley | |
| 3,080,170 A | 3/1963 | Colby | |
| 3,306,621 A | 2/1967 | Fisher | |
| 3,708,177 A * | 1/1973 | Baermann | 277/378 |
| 3,788,650 A * | 1/1974 | Place | F16J 15/36 277/378 |
| 3,851,889 A * | 12/1974 | Nisper | 277/461 |
| 3,931,976 A | 1/1976 | Duquenne | |
| 4,252,331 A * | 2/1981 | Siegel | F16J 15/32 277/586 |
| 4,575,103 A | 3/1986 | Pedu | |
| 4,795,168 A * | 1/1989 | Adams et al. | 277/378 |
| 5,078,411 A * | 1/1992 | Geco | 277/378 |
| 5,161,804 A * | 11/1992 | Orlowski et al. | 277/378 |
| 5,263,816 A | 11/1993 | Weimer et al. | |
| 5,730,447 A * | 3/1998 | Dawson | F16J 15/3444 277/378 |
| 6,142,477 A | 11/2000 | Meinze | |
| 6,572,113 B2 | 6/2003 | Care | |
| 6,805,358 B2 * | 10/2004 | Dawson et al. | 277/421 |
| 7,267,186 B2 | 9/2007 | Dick | |
| 7,722,050 B2 * | 5/2010 | Roddis | 277/378 |

(Continued)

*Primary Examiner* — Nathan Cumar
(74) *Attorney, Agent, or Firm* — Norton Rose Fulbright Canada LLP

(57) ABSTRACT

A carbon seal assembly comprises an annular member adapted to be secured to a structure. An annular seal runner is sealingly mounted to a shaft to rotate therewith, with the seal runner being made of a material complementary to that of the annular member for magnetic attraction therebetween. An annular carbon seal element is mounted to the annular seal runner to rotate therewith and positioned in a gap between the annular member and the annular seal runner, the annular carbon seal element having an annular wear surface abutting against a face of the annular member. A cross-sectional area of the annular carbon seal element increases as the axial dimension of the annular seal runner decreases for at least a part of the seal.

19 Claims, 2 Drawing Sheets

(56) References Cited

U.S. PATENT DOCUMENTS

| | | | |
|---|---|---|---|
| 8,038,155 B2 | 10/2011 | Zheng et al. | |
| 2006/0244221 A1* | 11/2006 | Villeneuve | F16J 15/3444 |
| | | | 277/410 |
| 2008/0042364 A1* | 2/2008 | Zheng et al. | 277/378 |
| 2010/0264597 A1* | 10/2010 | Sato | F16J 15/3488 |
| | | | 277/358 |
| 2014/0035233 A1* | 2/2014 | Takahashi | F16J 15/3488 |
| | | | 277/361 |

* cited by examiner

CARBON SEAL ASSEMBLY

TECHNICAL FIELD

The present disclosure relates to gas turbine engines, and carbon seal assemblies in gas turbine engines.

BACKGROUND OF THE ART

Prior carbon seal technology provides sealing when a rotating seal runner is attracted to a stationary magnet and contact is made on a carbon element against the stationary magnet. When wear of the carbon element occurs, the seal runner moves closer to the magnet, increasing the force of the magnetic field on the seal runner, resulting in additional pressure on the seal runner. Moreover, the rate of wear increases as the magnetic force increases, thus reducing the service life of the seal in the seal runner.

SUMMARY

In one aspect, there is provided a carbon seal assembly comprising: an annular member adapted to be secured to a structure; an annular seal runner adapted to be sealingly mounted to a shaft to rotate therewith, with the seal runner being made of a material complementary to that of the annular member for magnetic attraction therebetween; and an annular carbon seal element mounted to the annular seal runner to rotate therewith and positioned in a gap between the annular member and the annular seal runner, the annular carbon seal element having an annular wear surface abutting against a face of the annular member, a cross-sectional area of the annular carbon seal element increasing as the axial dimension of the annular seal runner decreases for at least a part of the seal.

In a second aspect, there is provided an engine comprising: a structure; a shaft operatingly mounted to the structure to rotate relative to the structure; a carbon seal assembly comprising: an annular member secured to the structure; an annular seal runner sealingly mounted to the shaft to rotate therewith, with the seal runner being made of a material complementary to that of the annular member for magnetic attraction therebetween; and an annular carbon seal element mounted to the annular seal runner to rotate therewith and positioned in a gap between the annular member and the annular seal runner, the annular carbon seal element having an annular wear surface abutting against a face of the annular member, a cross-sectional area of the annular carbon seal element increasing as the axial dimension of the annular seal runner decreases for at least a part of the seal.

In a third aspect, there is provided a carbon seal assembly comprising: an annular member adapted to be secured to a structure; an annular seal runner adapted to be sealingly mounted to a shaft to rotate therewith, with the seal runner being made of a material complementary to that of the annular member for magnetic attraction therebetween; and an annular carbon seal element mounted to the annular seal runner to rotate therewith and positioned in a gap between the annular member and the annular seal runner, the annular carbon seal element having an annular wear surface abutting against a face of the annular member, at least a part of a sectional shape of the annular carbon seal element having an increasing radial dimension along an axial direction of the annular carbon seal element from the annular wear surface toward the annular seal runner.

In a fourth aspect, there is provided an engine comprising: a structure; a shaft operatingly mounted to the structure to rotate relative to the structure; a carbon seal assembly comprising: an annular member secured to the structure; an annular seal runner sealingly mounted to the shaft to rotate therewith, with the seal runner being made of a material complementary to that of the annular member for magnetic attraction therebetween; and an annular carbon seal element mounted to the annular seal runner to rotate therewith and positioned in a gap between the annular member and the annular seal runner, the annular carbon seal element having an annular wear surface abutting against a face of the annular member, at least a part of a sectional shape of the annular carbon seal element having an increasing radial dimension along an axial direction of the annular carbon seal element from the annular contact surface toward the annular seal runner.

Further details of these and other aspects of the present invention will be apparent from the detailed description and figures included below.

DESCRIPTION OF THE DRAWINGS

Reference is now made to the accompanying figures, in which.

DETAILED DESCRIPTION OF THE EMBODIMENTS

Figure 1:
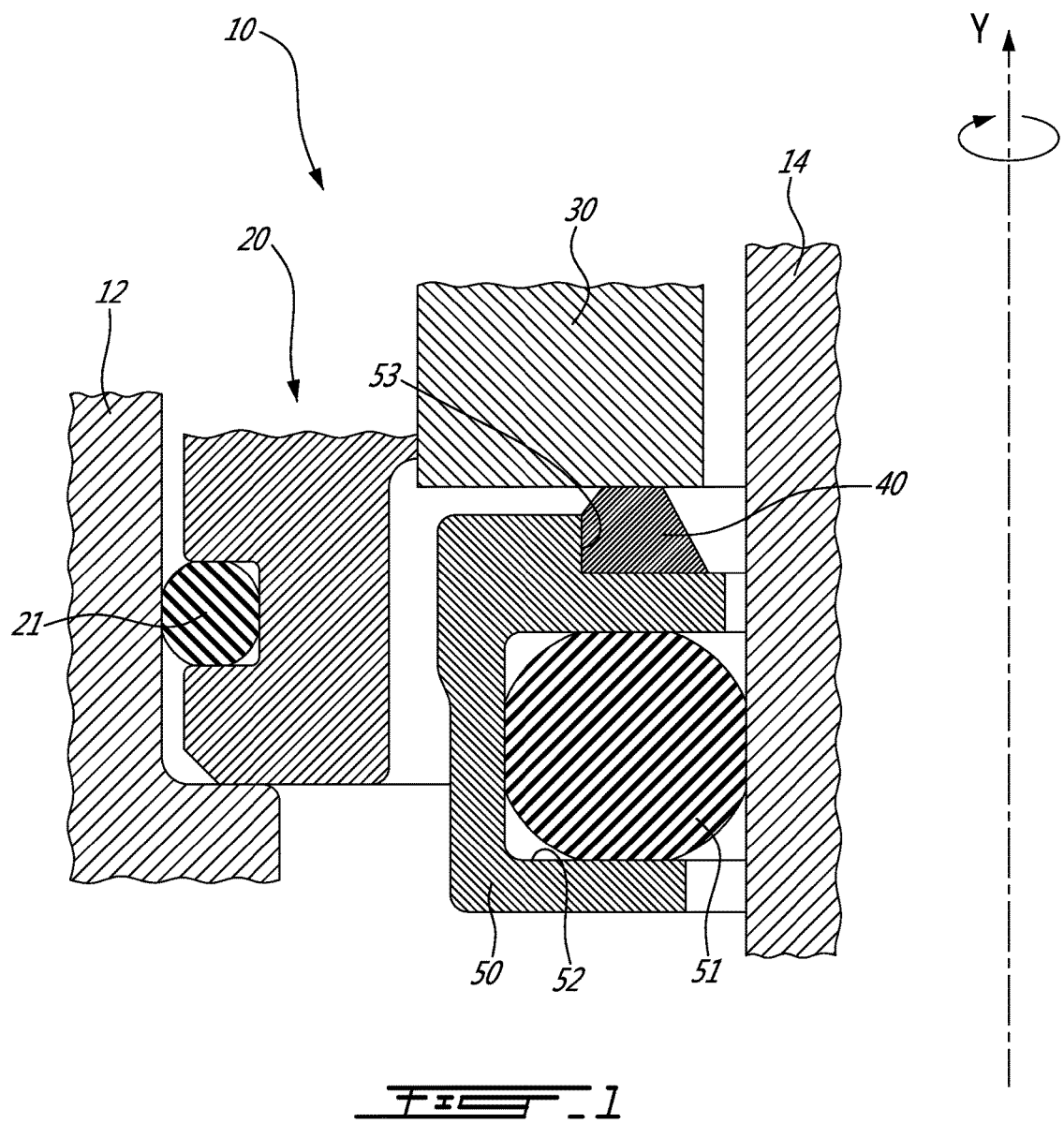
FIG. 1 is a cross-sectional view of a carbon seal assembly between a structure and a shaft.

Referring to FIG. 1, there is illustrated at 10 a carbon seal assembly. The carbon seal assembly 10 is located in a gap between a structure 12 and a rotation component, such as shaft 14. It is pointed out that the structure 12 and the shaft 14 may be in various types of engines, such as gas turbine engines of aircraft. In the illustrated embodiment, the shaft 14 rotates about axis Y. Hence, some components of the carbon seal assembly may be annular, as described hereinafter.

When used in a gas turbine engine, the carbon seal assembly 10 of the present invention may be disposed about any rotating shaft or other element thereof, such as for example about at least one of the main engine shafts. Alternately, the carbon seal assembly 10 may be employed to seal another rotating shaft in the gas turbine engine or in another turbomachine, pump, compressor, turbocharger or the like.

The carbon seal assembly 10 may comprise a seal housing 20 that is secured to the structure 12. A seal 21 may be provided between the seal housing 20 and the structure 12 to prevent fluid leaks therebetween. In the illustrated embodiment, the seal 21 is located in an annular channel 22 defined in the seal housing 20. The seal 21 is shown as being an O-ring but any other type of seal, sealing device or gasket may be used as alternatives to the O-ring. Moreover, more than one seal could be used. The material and the shape of the seal 21 are selected as a function of the contemplated use of the structure 12 and the shaft 14 (pressures, temperatures, exposure to fluids). Also, the annular channel 22 may be defined in the structure 12 instead of in the seal housing 20.

An annular magnet 30 may be fixed to the seal housing 20 and hence, immovable relative to the structure 12. The seal housing 20 and the annular magnet 30 project radially inward of the structure 12 toward the shaft 14, so as to partially close the gap between the structure 12 and the shaft 14. In another embodiment, the magnets may be secured directly to the structure 12. The annular magnet 30 is made of any appropriate material producing a suitable attracting force.

An annular carbon element 40 is connected to a seal runner 50 that rotates with the shaft 14. The annular carbon element 40 is shown as being axisymmetric and in contact against the annular magnet 30, with the annular carbon element 40 rotating with the shaft 14 while the annular magnet 30 is fixed relative to the shaft 14. The runner 50 is typically made of a metallic material that is attracted by the annular magnet 30. Alternatively, the runner 50 could be made of a magnetic material while the annular magnet 30 could be a metallic ring. Hence, the carbon element 40 seals the gap between the annular magnet 30 and the runner 50. The carbon element 40 is a "hard matter" seal, as opposed to a soft matter seal (e.g., flexible and elastic seals of polymers). The annular carbon element 40 may be carbon in any appropriate constitution in accordance with its use. For instance, graphite may be used.

A seal 51 is located in a housing 52 of the runner 50. The seal 51 and the housing 52 are of annular shape, as the runner 50 and seal 51 concurrently surround the shaft 14. Accordingly, the seal 51 seals the gap between the shaft 14 and the runner 50. The runner 50 and seal 51 are sized to remain on the shaft 14, for instance by a resilient action of the seal 51 against the shaft 14. The seal 51 is shown as being an O-ring but may be any appropriate type of seal or gasket. For instance, wiper seals, gaskets, cup seals, and the like are a few of the possible sealing devices that could be used between the runner 50 and the shaft 14. The material and the shape of the seal 51 are selected as a function of the contemplated use of the structure 12 and the shaft 14 (pressures, temperatures, exposure to fluids).

A shoulder 53 is defined in the runner 50 and provides an abutment surface for the annular carbon element 40. Other configurations are considered, such as an annular channel, a flat surface, mating engagement, etc. The annular carbon element 40 may be secured to the runner 50 with adhesives, mating connectors, fasteners or the like, for the annular carbon element 40 to remain engaged to the runner 50 and rotate therewith.

As the shaft 14 rotates, the carbon element 40 will rub against the annular magnet 30. As a result, the carbon element 40 will wear over time. Due to the attraction forces between the annular magnet 30 and the runner 50, the runner 50 will gradually move along the shaft 14 in direction Y, thereby keeping the carbon element 40 against the annular magnet 30, to seal the gap between the annular magnet 30 and the runner 50.

The annular carbon element 40 is shown, in this example, having a five-sided section. It is observed that a sectional thickness of the annular carbon element 40 (the difference between the outer diameter and the inner diameter) increases in the axial direction (axis Y), away from the annular magnet 30. In other words, the sectional thickness (i.e., circumferential cross-sectional area) of the annular carbon element 40 increases as the seal wears, and flares away from the annular magnet 30. Therefore, as the annular carbon element 40 wears down over time from rubbing against the annular magnet 30, and thus reduces in width (along the Y axis), the contact surface area between annular magnet 30 and annular carbon element 40 increases. This may result in lower stresses and a slower wear rate than a prior-art annular carbon element without a sectional thickness increase. On the other hand, by having a smaller initial sectional thickness, the friction between the annular magnet 30 and the annular carbon element 40 is maintained relatively low in comparison to the greater sectional thickness near the runner 50.

Figure 2:
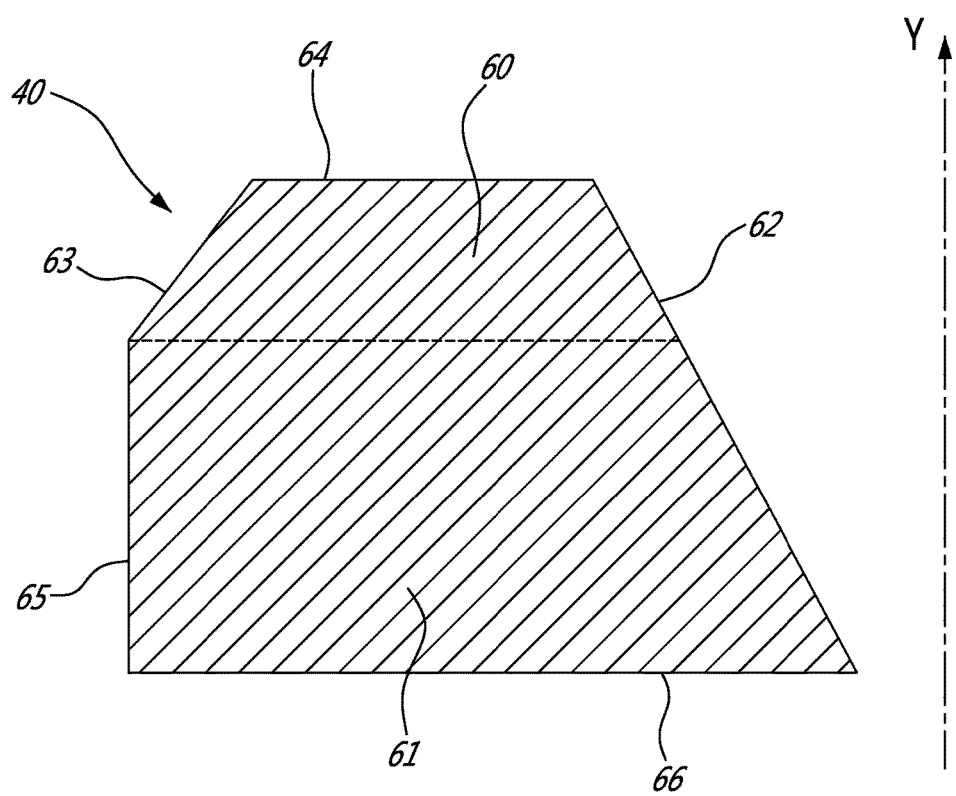
FIG. 2 is a schematic view of a sectional shape of an annular carbon element of the carbon seal assembly of FIG. 1.

Referring to FIG. 2, a sectional shape of the annular carbon element 40 is schematically illustrated. The sectional shape is a five-sided polygon, made of a first trapezoid sectional shape portion 60, and a second trapezoid sectional shape portion 61. The first portion 60 may be referred to as a leading portion as it is closer to the wear interface with the annular magnet 30, while the second portion 61 may be referred to as a trailing portion, as it is farther away from the wear interface with the annular magnet 30. Despite the portions 60 and 61 being described separately, the annular carbon element 40 may be a monolithic piece. The trapezoid portion 60 is shown having its inner and outer edge surfaces 62 and 63 diverging away from one another away from the wear surface 64.

The trapezoid portion 61 has the outer edge surface 65 being generally parallel to axis Y, and thus square relative to the wear surface 64 and the abutment surface 66. Accordingly, the square arrangement of the outer edge surface 65 and of the abutment surface 66 allow the annular carbon element 40 to be abuttingly received in the counterbore-like receptacle (including shoulder 53) of the runner 50, with suitable contact surface between the annular carbon element 40 and the runner 50. The sectional shape shown in FIGS. 1 and 2 is one of numerous sectional shapes possible for the annular carbon element 40.

The above description is meant to be exemplary only, and one skilled in the art will recognize that changes may be made to the embodiments described without departing from the scope of the invention disclosed. For example, the annular carbon element 40 may have a trapezoid shape, with the runner 50 having a corresponding shape. The annular magnet 30 may be integrated directly in the structure 12, without housing 20 or seal 21. The runner 50 may be sealingly connected to the shaft 14 by other means than the seal 51, etc. Still other modifications which fall within the scope of the present invention will be apparent to those skilled in the art, in light of a review of this disclosure, and such modifications are intended to fall within the appended claims.

What is claimed is:

1. A carbon seal assembly comprising:
   an annular member adapted to be secured to a structure;
   an annular seal runner adapted to be sealingly mounted to a shaft to rotate therewith, with the seal runner being made of a material complementary to that of the annular member for magnetic attraction therebetween; and
   an annular carbon seal element mounted to the annular seal runner to rotate therewith and positioned in a gap between the annular member and the annular seal runner, the annular carbon seal element having a leading sectional shape portion and a trailing sectional shape portion, with the leading sectional shape portion projecting axially beyond the annular seal runner and defining an annular wear surface abutting against, and in contact with, a face of the annular member when the annular carbon seal element rotates, an area of the annular wear surface increasing as the axial dimension of the annular carbon seal element decreases when worn for at least a part of the leading sectional shape portion of the seal.

2. The carbon seal assembly according to claim 1, wherein the entirety of the sectional shape of the annular carbon seal element has an increasing cross-sectional thickness along the axial direction of the annular carbon seal element from the annular wear surface toward the annular seal runner.

3. The carbon seal assembly according to claim 1, wherein the leading sectional shape portion has a trapezoid shape with an outer side and an inner side being oblique relative to the axial direction.

4. The carbon seal assembly according to claim 1, wherein the trailing sectional shape portion has a trapezoid shape with an outer side parallel to the axial direction, and an inner side being oblique relative to the axial direction.

5. The carbon seal assembly according to claim 4, wherein the outer side of the trailing sectional shape portion is in abutment with a counterbore surface of the annular seal runner.

6. The carbon seal assembly according to claim 1, wherein the sectional shape of the annular carbon seal element is a five-sided polygonal shape.

7. The carbon seal assembly according to claim 1, wherein the annular carbon seal element is made of hard matter carbon.

8. The carbon seal assembly according to claim 1, wherein the annular member is made of a magnetic material, and wherein the annular seal runner is made of a metallic material attracted to the magnetic material.

9. The carbon seal assembly according to claim 1, further comprising at least one resilient annular seal between the annular seal runner and the shaft.

10. An engine comprising:
a structure;
a shaft operatingly mounted to the structure to rotate relative to the structure;
a carbon seal assembly comprising:
an annular member secured to the structure;
an annular seal runner sealingly mounted to the shaft to rotate therewith, with the seal runner being made of a material complementary to that of the annular member for magnetic attraction therebetween; and
an annular carbon seal element mounted to the annular seal runner to rotate therewith and positioned in a gap between the annular member and the annular seal runner, the annular carbon seal element having a leading sectional shape portion and a trailing sectional shape portion, with the leading sectional shape portion projecting axially beyond the annular seal runner and defining an annular wear surface abutting against, and in contact with, a face of the annular member when the annular carbon seal element rotates, an area of the annular wear surface increasing as the axial dimension of the annular carbon seal element decreases when worn for at least a part of the leading sectional shape portion of the seal.

11. The engine according to claim 10, wherein the entirety of the sectional shape of the annular carbon seal element has an increasing cross-sectional thickness along the axial direction of the annular carbon seal element from the annular wear surface toward the annular seal runner.

12. The engine according to claim 10, wherein the leading sectional shape portion has a trapezoid shape with an outer side and an inner side being oblique relative to the axial direction.

13. The engine according to claim 10, wherein the trailing sectional shape portion has a trapezoid shape with an outer side parallel to the axial direction, and an inner side being oblique relative to the axial direction.

14. The engine according to claim 13, wherein the outer side of the trailing sectional shape portion is in abutment with a counterbore surface of the annular seal runner.

15. The engine according to claim 10, wherein the sectional shape of the annular carbon seal element is a five-sided polygonal shape.

16. The engine according to claim 10, wherein the annular carbon seal element is made of hard matter carbon.

17. The engine according to claim 10, wherein the annular member is made of a magnetic material, and wherein the annular seal runner is made of a metallic material attracted to the magnetic material.

18. The engine according to claim 10, further comprising at least one resilient annular seal between the annular seal runner and the shaft.

19. The carbon seal assembly according to claim 9, wherein the at least one resilient annular seal has a sectional shape greater than the annular carbon seal element.

* * * * *